US008149704B2

(12) United States Patent
Hasegawa et al.

(10) Patent No.: US 8,149,704 B2
(45) Date of Patent: Apr. 3, 2012

(54) COMMUNICATION APPARATUS AND DATA COMMUNICATION METHOD

(75) Inventors: Yohei Hasegawa, Tokyo (JP); Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 855 days.

(21) Appl. No.: 11/206,069

(22) Filed: Aug. 18, 2005

(65) Prior Publication Data

US 2006/0039287 A1 Feb. 23, 2006

(30) Foreign Application Priority Data

Aug. 23, 2004 (JP) ................................ 2004-242207

(51) Int. Cl.
 *H04L 12/56* (2006.01)
(52) U.S. Cl. .................. 370/232; 370/238; 370/412
(58) Field of Classification Search .......... 370/229–232, 370/235, 238, 411, 412, 417, 418
See application file for complete search history.

(56) References Cited

U.S. PATENT DOCUMENTS

| 6,275,470 | B1 * | 8/2001 | Ricciulli | 370/238 |
| 6,563,796 | B1 * | 5/2003 | Saito | 370/252 |
| 7,061,862 | B2 * | 6/2006 | Horiguchi et al. | 370/230 |
| 7,149,185 | B1 * | 12/2006 | Suni | 370/230 |
| 7,333,434 | B2 * | 2/2008 | Grenot et al. | 370/235 |
| 2002/0031086 | A1 * | 3/2002 | Welin | 370/229 |
| 2005/0188407 | A1 * | 8/2005 | van Beek et al. | 725/81 |

FOREIGN PATENT DOCUMENTS

| JP | 5-160859 | A | 6/1993 |
| JP | 7-221779 | A | 8/1995 |
| JP | 2000-261478 | A | 9/2000 |
| JP | 2002-544682 | A | 12/2002 |
| JP | 2003-110604 | A | 4/2003 |
| JP | 2003-152776 | A | 5/2003 |
| JP | 2004-7361 | A | 1/2004 |
| JP | 2004-102775 | A | 4/2004 |
| WO | WO 00/67435 | | * 11/2000 |

OTHER PUBLICATIONS

Tanaka, Toshinori et al. "The world of high speed mobile computing using PHS," NTT R&D, vol. 48, No. 2, Feb. 10, 1999, pp. 203-208 (continuous pagination).
Hasegawa, Yōhei et al. "Proposal and evaluation of a multiple route communication method that allows for the characteristics of TCP," IEICE Technical Report (*Shingaku Gihō*) NS2003-328 IN2003-283, Mar. 5, 2004.

* cited by examiner

*Primary Examiner* — Aung S Moe
*Assistant Examiner* — Kerri Rose
(74) *Attorney, Agent, or Firm* — Sughrue Mion, PLLC

(57) ABSTRACT

A communication apparatus includes an arrival time estimation unit, connection selection unit, and network processing unit. The arrival time estimation unit estimates, for each block and each of a plurality of connections, an arrival time until a block generated by segmenting transmission data arrives from the apparatus at a final reception terminal or a merging apparatus through a network. The connection selection unit selects, for each block, a connection with the shortest arrival time from the plurality of connections on the basis of the estimation result. The network processing unit outputs each block to the network by using the selected connection. A data communication method and a data communication program are also disclosed.

38 Claims, 9 Drawing Sheets

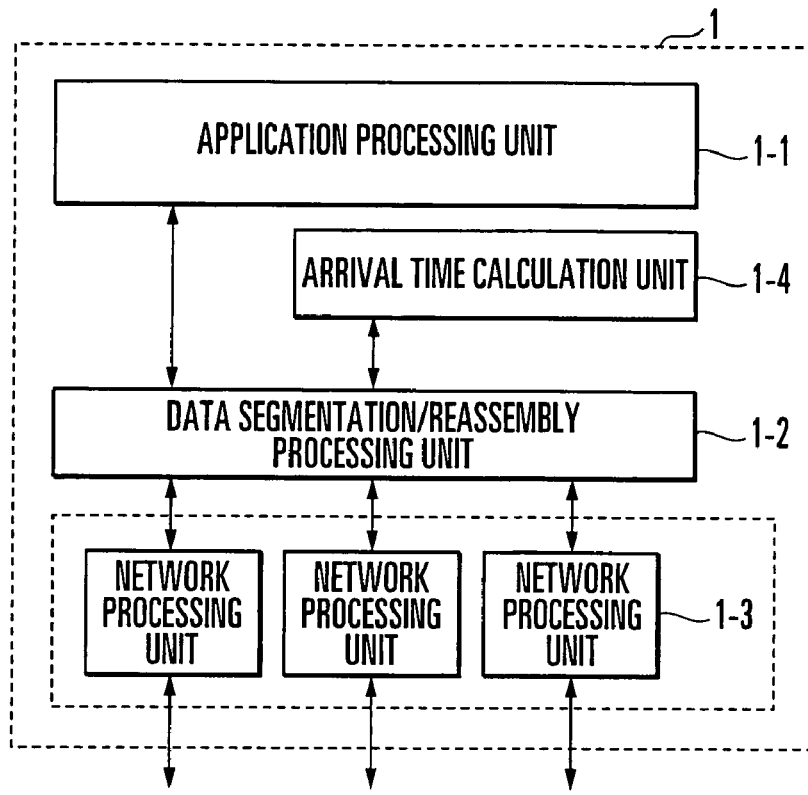
F I G. 1
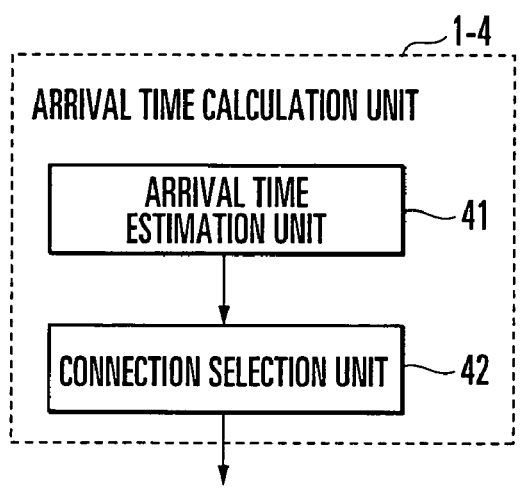
F I G. 2

COMMUNICATION APPARATUS AND DATA COMMUNICATION METHOD

CROSS-REFERENCE TO RELATED APPLICATION

This application claims priority to and the benefit of Japanese Patent Application No. JP242207/2004, filed on Aug. 23, 2004, in the Japan Patent Office, the entire content of which is incorporated by this reference.

BACKGROUND OF THE INVENTION

The present invention relates to a communication apparatus connected to another apparatus through a network and, more particularly, to a communication apparatus and data communication method to execute communication by distributing data to a plurality of connections.

A communication method is conventionally available in which the data of one communication flow used in communication between a transmission terminal and a reception terminal is segmented into a plurality of flows and reassembled at last. For example, a communication method has been proposed in which a gateway is installed in each of a first LAN (Local Area Network) to which a transmission terminal belongs and a second LAN to which a reception terminal belongs. TCP (Transmission Control Protocol) connection data sent from the transmission terminal is distributed at the gateway of the first LAN to communication paths in packets. At the gateway of the second LAN, the order reversal of the packets received from the plurality of communication paths is corrected in accordance with the sequence number of TCP, thereby reassembling the data (e.g., reference 1 (Japanese Patent Laid-Open No. 2000-261478)). However, since this communication method presumes that the TCP of the terminal is used in one communication path, the performance of the communication paths cannot sufficiently be exhibited.

To efficiently use a plurality of communication lines to increase the line utilization factor, the following three methods can be used. As the first method, a function is added to the TCP of a terminal to change communication conventionally using one TCP connection to communication using a plurality of TCP connections (e.g., reference 2 (Japanese Patent Laid-Open No. 2003-110604)). In the first method, data communication executed between a transmission terminal and a reception terminal by one communication flow is segmented into a plurality of communication flows to send the data parallelly. When the transmission terminal is to transmit data to the reception terminal, the communication protocol of the transmission terminal segments the communication data of one communication flow into a plurality of communication flows. The transmission terminal adds, to the packet data of a TCP/IP packet, a new header serving as reassembly information to reassemble the plurality of segmented communication flows into the original data and transmits the data in the respective communication flows. The communication protocol of the reception terminal reassembles one communication flow by referring to the reassembly information of the data received from the plurality of communication flows, thereby reassembling the original data.

As the second method, in communication using a plurality of paths, the quality information of each path is transmitted from the reception terminal to the transmission terminal, and the transmission terminal determines, on the basis of the quality information, the quantity of data to be transmitted to each path (e.g., reference 3 (Japanese Patent Laid-Open No. 2004-7361)).

As the third method, in communication using a plurality of paths, the transmission terminal measures the throughput available in each path in transmitting several data at the start of transfer and determines, on the basis of the measurement result, the size of data to be distributed to each path (e.g., reference 4 (Japanese Patent Laid-Open No. 2003-152776)).

As the first conventional problem, in the first method disclosed in reference 2 and the third method disclosed in reference 4, when data distributed to a plurality of paths on the transmitting side is reassembled on the receiving side, a long time is required to arrange the data received from the plurality of paths in order. As a result, the transmission rate obtained by the reception terminal becomes low.

As the second conventional problem, in the first method disclosed in reference 2 and the third method disclosed in reference 4, when data distributed to a plurality of paths on the transmitting side is reassembled on the receiving side, a buffer necessary for arranging the data received from the plurality of paths in order becomes large, resulting in an increase in cost.

As the third conventional problem, in the first method disclosed in reference 2, the second method disclosed in reference 3, and the third method disclosed in reference 4, since the transmission queue in the transmission terminal is not taken into consideration, the calculation error of the arrival time becomes large.

As the fourth conventional problem, in the second method disclosed in reference 3, the effective throughput of the communication protocol is not taken into consideration. For example, the effective throughput of TCP as the most widely used protocol is determined on the basis of the packet loss rate, a delay in path, and the advertised window size and congestion window size of TCP. In TCP, since packets are retransmitted, the throughput of packet level does not match the effective throughput of TCP. Additionally, in TCP, the transmission rate is adjusted in accordance with the packet loss or advertised window size. Since the transmission rate changes every moment, the calculation error of the arrival time becomes large if the arrival time is simply fed back from the reception terminal.

As the fifth conventional problem, in the third method disclosed in reference 4, when the usable band of each path changes or when the communication rate of the TCP connection of each path changes, the whole communication cannot finish until communication in a slow path is completed, and the communication performance decreases. Especially in TCP, the communication throughput is gradually raised at the start of transfer. Then, the communication throughput is adjusted in accordance with the congestion condition (traffic condition). For this reason, when data is distributed to the paths on the basis of the measurement result at the start of communication, the data is not appropriately distributed to the paths. As a result, the time until the end of communication becomes long, and the communication performance decreases.

SUMMARY OF THE INVENTION

The present invention has been made in consideration of the above-described problems, and has as its object to provide a communication apparatus and data communication method capable of efficiently implementing communication with flow segmentation/reassembly.

In order to achieve the above object, according to the present invention, there is provided a communication apparatus comprising an arrival time estimation unit which estimates, for each block and each of a plurality of connections, an arrival time until a block generated by segmenting transmission data arrives from the apparatus at one of a final reception terminal and a merging apparatus through a network, a connection selection unit which selects, for each block, a connection with a shortest arrival time from the plurality of connections on the basis of an estimation result by the arrival time estimation unit, and a network processing unit which outputs each block to the network by using the connection selected by the connection selection unit.

There is also provided a data communication method comprising a procedure of estimating, for each block and each of a plurality of connections, an arrival time until a block generated by segmenting transmission data arrives from an apparatus at one of a final reception terminal and a merging apparatus through a network, a procedure of selecting, for each block, a connection with a shortest arrival time from the plurality of connections on the basis of an estimation result, and a procedure of outputting each block to the network by using the selected connection.

BRIEF DESCRIPTION OF THE DRAWINGS

FIG. 1 is a block diagram showing an arrangement example of a communication apparatus according to the first embodiment of the present invention;

FIG. 2 is a block diagram showing an arrangement example of an arrival time calculation unit according to the first embodiment of the present invention;

DESCRIPTION OF THE PREFERRED EMBODIMENTS

Figure 3:
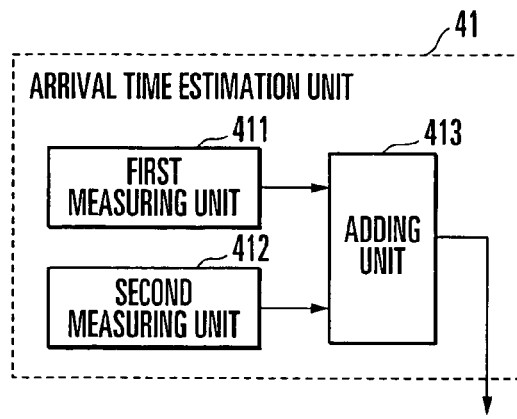
FIG. 3 is a block diagram showing an arrangement example of an arrival time estimation unit according to the first embodiment of the present invention.

The embodiments of the present invention will be described below in detail with reference to the accompanying drawings.

First Embodiment

FIG. 1 shows the arrangement of a communication apparatus according to the first embodiment of the present invention. In this embodiment, a communication apparatus 1 includes an application processing unit 1-1, data segmentation/reassembly processing unit 1-2, network processing units 1-3, and arrival time calculation unit 1-4.

The application processing unit 1-1 processes an arbitrary application program. In transmitting data, the application processing unit 1-1 sends data to the data segmentation/reassembly processing unit 1-2. In receiving data, the application processing unit 1-1 receives data from the data segmentation/reassembly processing unit 1-2.

In transmitting data, the data segmentation/reassembly processing unit 1-2 receives data from the application processing unit 1-1, segments the received data into an arbitrary number of blocks, and adds, to the top of each of the segmented blocks, information (to be referred to as reassembly information hereinafter) to reassemble the blocks to the original data. Then, the data segmentation/reassembly processing unit 1-2 inquires of the arrival time calculation unit 1-4 about which one of a plurality of TCP connections has the shortest data arrival time to the reception terminal and instructs the network processing unit 1-3 to transmit the blocks by using the TCP connection selected by the arrival time calculation unit 1-4. In receiving data, the data segmentation/reassembly processing unit 1-2 identifies the segmented blocks by referring to reassembly information stored at the top of each of the data of the plurality of TCP connections received from the network processing unit 1-3, reassembles the data before segmentation by combining the plurality of blocks, and sends the reassembled data to the application processing unit 1-1.

Each network processing unit 1-3 establishes a connection. In transmitting data, the network processing unit 1-3 outputs data received from the data segmentation/reassembly processing unit 1-2 to the network by using a TCP connection received from the data segmentation/reassembly processing unit 1-2. In receiving data, the network processing unit 1-3 sends data of a TCP connection received from the network to the data segmentation/reassembly processing unit 1-2.

The arrival time calculation unit 1-4 calculates the data arrival time to the reception terminal for each block on the basis of the transmission queue length (the length of a transmission queue to store blocks) and path delay of each of the plurality of TCP connections established by the network processing units 1-3. The arrival time calculation unit 1-4 selects a TCP connection with the shortest arrival time from the plurality of TCP connections and notifies the data segmentation/reassembly processing unit 1-2 of it.

More specifically, as shown in FIG. 2, the arrival time calculation unit 1-4 has an arrival time estimation unit 41 and a connection selection unit 42. The arrival time estimation unit 41 estimates the arrival time of each TCP connection from the apparatus 1 to the reception terminal for each block. The connection selection unit 42 selects, on the basis of the estimation result by the arrival time estimation unit 41, a TCP connection with the shortest arrival time from the plurality of TCP connections for each block.

As shown in FIG. 3, the arrival time estimation unit 41 further includes a first measuring unit 411 second measuring unit 412, and adding unit 413. The first measuring unit 411 measures a first time after a block is distributed to the connection selected by the connection selection unit 42 until the block is output to the network. The second measuring unit 412 measures a second time after a block is output to the network until the block arrives at the reception terminal. The adding unit 413 adds the first and second times to estimate the arrival time.

Figure 4:
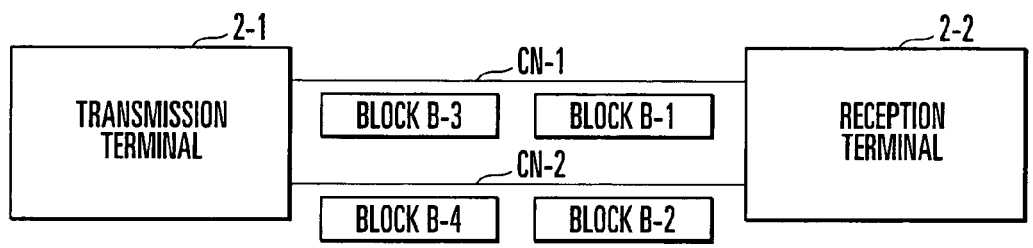
FIG. 4 is a view showing the flow of data between a transmission terminal and a reception terminal according to the first embodiment of the present invention.
Figure 5:
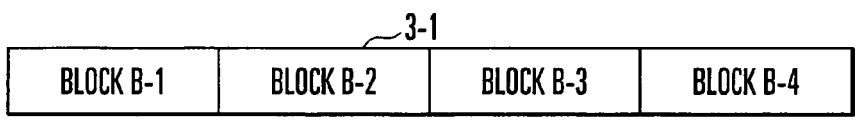
FIG. 5 is a view showing a data segmentation method and segmented blocks according to the first embodiment of the present invention.

FIG. 4 shows the flow of data from a transmission terminal 2-1 to a reception terminal 2-2 according to this embodiment. Each of the transmission terminal 2-1 and reception terminal 2-2 is formed from the communication apparatus 1 shown in FIG. 1. When data is to be sent from the transmission terminal 2-1 to the reception terminal 2-2, the transmission terminal 2-1 segments transmission data 3-1 into a plurality of blocks B-1 to B-4, as shown in FIG. 5. The transmission terminal 2-1 adds reassembly information to the top of each of the blocks B-1 to B-4 and sends the blocks B-1 to B-4 to the reception terminal 2-2 by using a plurality of TCP connections.

Each block has a size obtained by subtracting the size of reassembly information from the segment size of the TCP layer. FIGS. 4 and 5 show an example wherein the data 3-1 is segmented into the four blocks B-1 to B-4, and the blocks are transmitted by using two TCP connections CN-1 and CN-2. The blocks B-1 and B-3 are transmitted by using the TCP connection CN-1. The blocks B-2 and B-4 are transmitted by using the TCP connection CN-2.

The reception terminal 2-2 which has received the blocks from the transmission terminal 2-1 identifies the segmented blocks by referring to the reassembly information added to the top of each block and arranges the blocks in order to reassemble the original data from the plurality of blocks. In FIG. 4, the reception terminal 2-2 arranges the blocks B-1 to B-4 received from the TCP connections CN-1 and CN-2 to reassemble the original data.

Figure 6:
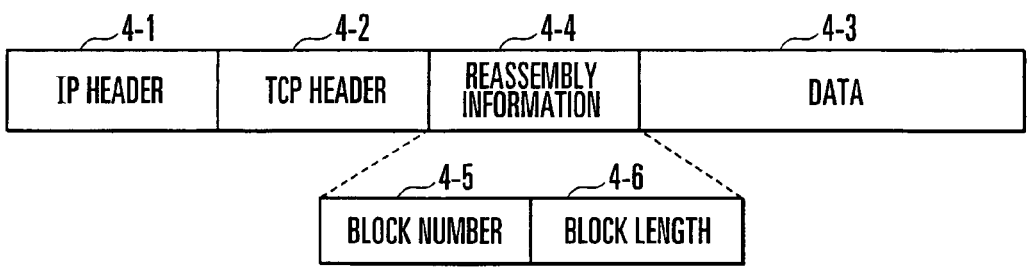
FIG. 6 is a view showing data reassembly information according to the first embodiment of the present invention.

FIG. 6 shows an example wherein the data segmentation/reassembly processing unit 1-2 of this embodiment adds reassembly information to the top of a block. FIG. 6 shows a state wherein a TCP/IP packet is created on the basis of each segmented block. Reference numeral 4-1 denotes an IP header; 4-2, a TCP header; 4-3, a block inserted in the payload of the TCP/IP packet; and 4-4, reassembly information added to the top of the block. The reassembly information 4-4 includes a block number 4-5 representing the order of the block and a block length 4-6. The transmission terminal 2-1 generates a plurality of blocks by segmenting transmission data and then adds the reassembly information 4-4 containing the block number 4-5 and block length 4-6 to the top of each block. In this embodiment, the reassembly information 4-4 is stored at the top of the block. However, the reassembly information 4-4 may be stored at an arbitrary position in the block.

Figure 7:
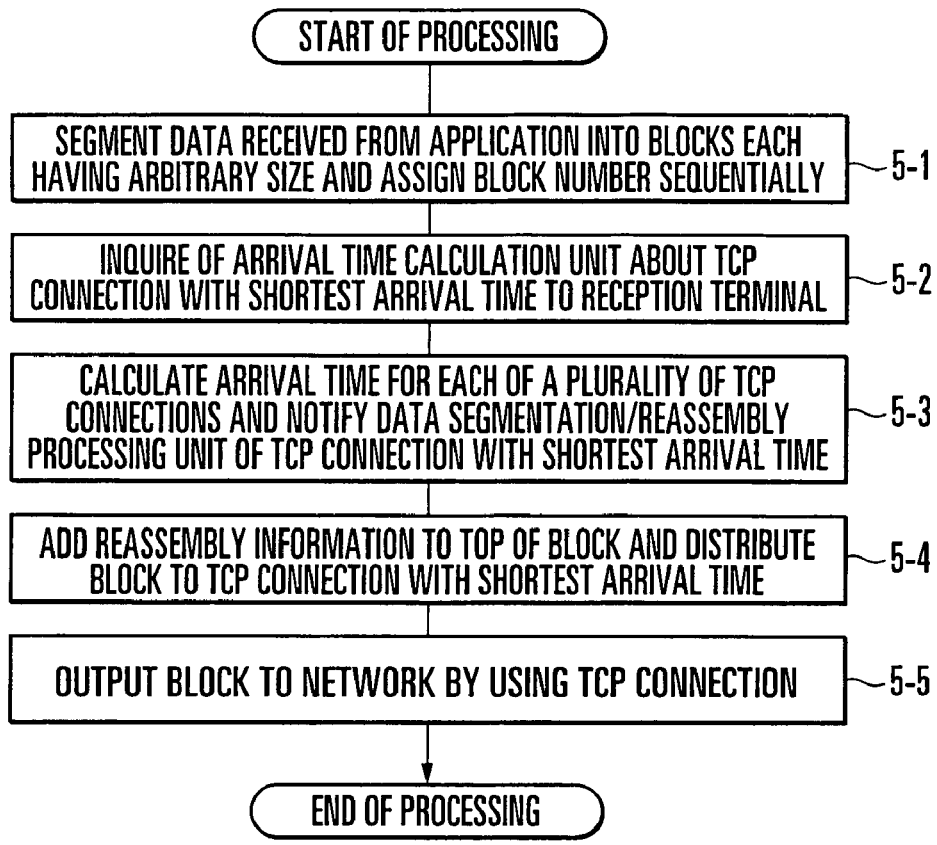
FIG. 7 is a flowchart showing processing in the transmission terminal according to the first embodiment of the present invention.

The processing in the transmission terminal 2-1 and reception terminal 2-2 according to this embodiment will be described next with reference to FIGS. 7 and 8. FIG. 7 shows communication processing in the transmission terminal 2-1 using a plurality of paths. When the application processing unit 1-1 of the transmission terminal 2-1 executes arbitrary processing, and data to be transmitted to the reception terminal 2-2 is generated, the processing shown in FIG. 7 starts in accordance with a data transmission instruction from the application processing unit 1-1 to the data segmentation/reassembly processing unit 1-2.

The data segmentation/reassembly processing unit 1-2 of the transmission terminal 2-1 segments data received from the application processing unit 1-1 into blocks each having an arbitrary size and assigns a number of each block (step 5-1 in FIG. 7). The data segmentation/reassembly processing unit 1-2 inquires of the arrival time calculation unit 1-4 about which one of the plurality of TCP connections established by the network processing units 1-3 has the shortest data arrival time to the reception terminal (step 5-2).

In response to the inquiry from the data segmentation/reassembly processing unit 1-2, the arrival time calculation unit 1-4 calculates, for each block, an arrival time T when the data is transmitted by each TCP connection and selects, for each block, a TCP connection with the shortest arrival time T from the plurality of TCP connections and notifies the data segmentation/reassembly processing unit 1-2 of it (step 5-3):

$$T = \min\left[\frac{Q}{Thr} + \frac{sRTT}{2}\right] \quad (1)$$

where Q is the size of data stored in the transmission queue of the data segmentation/reassembly processing unit 1-2 of the transmission terminal 2-1, Thr is the effective throughput of TCP (a throughput output from TCP to an adjacent protocol, i.e., a data size processible within a unit time), and sRTT is a smoothed RTT (Round Trip Time: the packet round-trip delay between the transmission terminal and the reception terminal). In addition, min[ ] indicates obtaining a minimum value. On the right-hand side of equation (1), obtaining Q/Thr indicates obtaining, on the basis of the measurement values Q and Thr, the first time after a block is distributed to a TCP connection until the block is output to the network. Obtaining sRTT/2 indicates obtaining, on the basis of the measurement value sRTT, the second time after a block is output to the network until the block arrives at the reception terminal. The first time can also be obtained by using the transmission waiting time of each connection in place of Q.

The data segmentation/reassembly processing unit 1-2 of the transmission terminal 2-1 adds reassembly information to the top of a segmented block and distributes the block to the TCP connection with the shortest arrival time (step 5-4). That is, the data segmentation/reassembly processing unit 1-2 instructs the network processing unit 1-3 to transmit the block with the added reassembly information by using the TCP connection received from the arrival time calculation unit 1-4.

The network processing unit 1-3 outputs the block received from the data segmentation/reassembly processing unit 1-2 to the network by using the TCP connection received from the data segmentation/reassembly processing unit 1-2 (step 5-5).

The arrival time calculation unit 1-4, data segmentation/reassembly processing unit 1-2, and network processing unit 1-3 execute the processing in steps 5-3 to 5-5 for each block. When all blocks are transmitted, and the processing of the application processing unit 1-1 is ended, the processing shown in FIG. 7 is ended.

Figure 9:
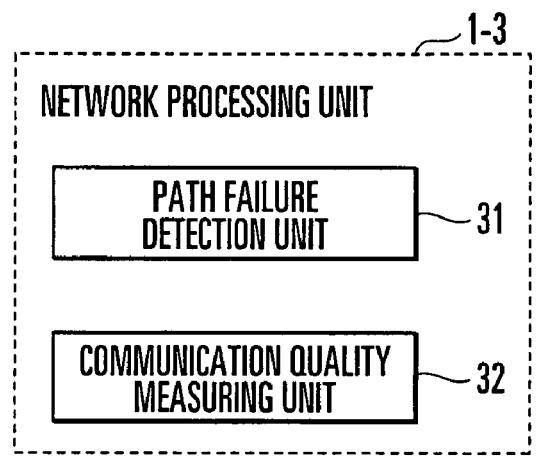
FIG. 9 is a block diagram showing an arrangement example of a network processing unit according to the first embodiment of the present invention.

As shown in FIG. 9, the network processing unit 1-3 may have a path failure detection unit 31 which detects a failure in each path and a communication quality measuring unit 32 which measures the communication quality of each path. In this case, when a TCP connection whose communication performance is considerably degraded or a TCP connection which is not communicable because of a failure is present, the data segmentation/reassembly processing unit 1-2 may select another TCP connection such that a block which is set in the transmission wait state in the TCP connection with the failure and stored in its transmission queue is transmitted by using the newly selected TCP connection.

The communication quality measuring unit 32 of the network processing unit 1-3 determines that the communication performance of a TCP connection is degraded when the effective throughput of TCP is lower than a predetermined throughput threshold value, sRTT exceeds a predetermined sRTT threshold value, the packet loss rate exceeds a predetermined packet loss threshold value, the packet round-trip delay time exceeds a predetermined delay threshold value, the packet round-trip delay time change rate exceeds a predetermined change rate threshold value, the link band on the path becomes lower than a predetermined band threshold value, the free band on the path becomes lower than a predetermined band threshold value, or the usable band on the path becomes lower than a predetermined band threshold value.

Figure 10:
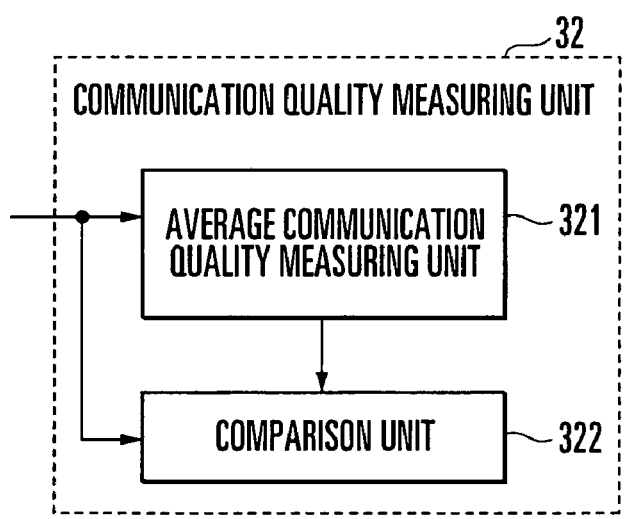
FIG. 10 is a block diagram showing an arrangement example of a communication quality measuring unit according to the first embodiment of the present invention.

As shown in FIG. 10, the communication quality measuring unit 32 of the network processing unit 1-3 may have an average communication quality measuring unit 321 which measures the average communication quality of all TCP connections, and a comparison unit 322 which compares the average communication quality measured by the average communication quality measuring unit 321 with the communication quality of each TCP connection. When a connection whose communication quality is lower than the average communication quality by a predetermined ratio or more is present in the plurality of TCP connections, it may be determined that the communication performance of the TCP connection is degraded.

When a retransmission timeout state (a state wherein no reception response is received from the apparatus of the transmission destination after data retransmission until the elapse of a predetermined time) occurs continuously a predetermined number of times or more in one of the TCP connections, the path failure detection unit 31 of the network processing unit 1-3 determines that a failure occurs in the path used by the connection.

Figure 8:
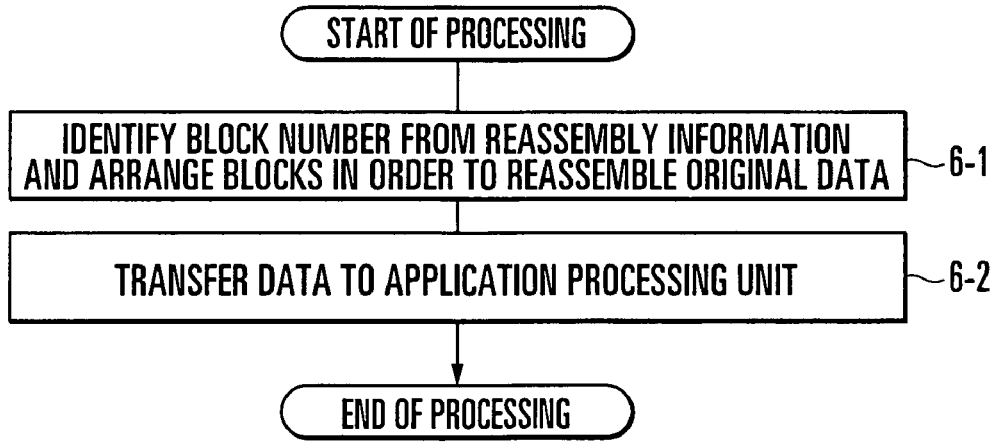
FIG. 8 is a flowchart showing processing in the reception terminal according to the first embodiment of the present invention.

FIG. 8 shows communication processing in the reception terminal 2-2. When the reception terminal 2-2 receives, from the network, a block transmitted from the transmission terminal 2-1, the processing shown in FIG. 8 starts. The network processing unit 1-3 of the reception terminal 2-2 transfers the block received from the network to the data segmentation/reassembly processing unit 1-2. The data segmentation/reassembly processing unit 1-2 recognizes the block number of the block by referring to the reassembly information added to its top and arranges blocks in order on the basis of the block numbers, thereby reassembling the original data from the plurality of blocks (step 6-1 in FIG. 8).

The data segmentation/reassembly processing unit 1-2 transfers the reassembled data to the application processing unit 1-1. The application processing unit 1-1 executes arbitrary processing. When all blocks are transferred to the application processing unit 1-1, and the arbitrary processing of the application processing unit 1-1 is ended, the processing shown in FIG. 8 is ended.

The contents of the processing of the communication apparatus according to the first embodiment of the present invention have been described above. In the prior art, when data distributed to a plurality of paths by the transmission terminal is reassembled on the receiving side, a long time is required to arrange the data in order. As a result, the transmission rate obtained by the reception terminal becomes low. In the communication method according to this embodiment, the arrival time from the transmission terminal to the reception terminal can more accurately be calculated. Since data arrive at the receiving side in the same order as that of data transmission by the transmission terminal, the time required to arrange the data in order in the reception terminal can be shortened, and the decrease in throughput can be suppressed.

In addition, since the buffer necessary for arranging the data in order in the reception terminal can be small, the cost of the communication apparatus can be reduced. Furthermore, in this embodiment, the transmission queue length of the transmission terminal is taken into consideration in calculating the arrival time, and the time of sending data from the transmission queue is calculated on the basis of the effective throughput of TCP. Hence, the arrival time can be calculated more accurately.

Second Embodiment

Figure 11:
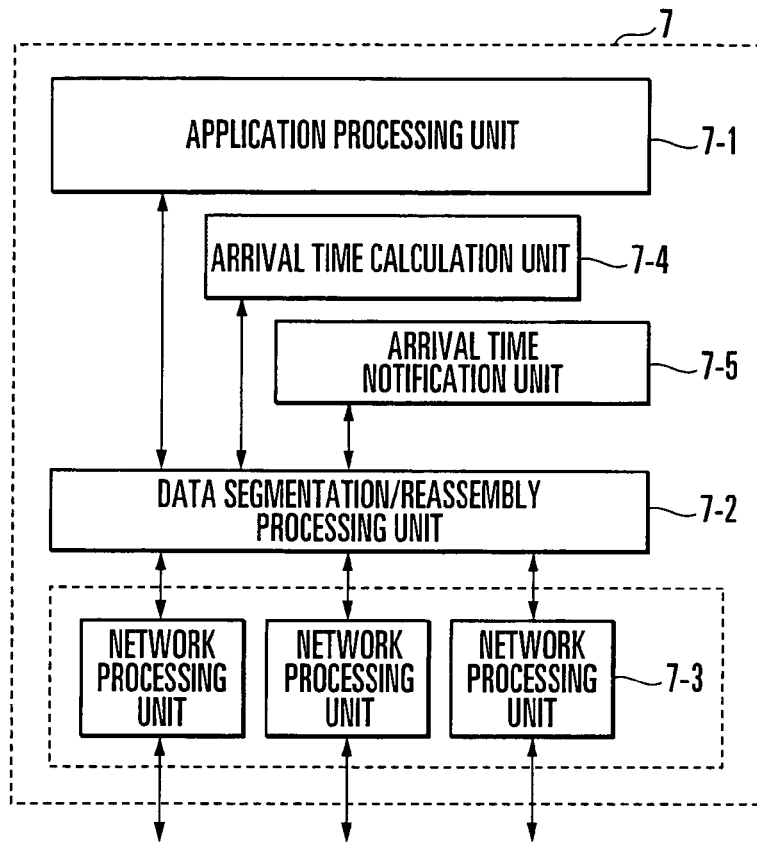
FIG. 11 is a block diagram showing an arrangement example of a communication apparatus according to the second embodiment of the present invention.

The second embodiment of the present invention will be described next. FIG. 11 shows the arrangement of a communication apparatus according to the second embodiment of the present invention. In this embodiment, a communication apparatus 7 includes an application processing unit 7-1, data segmentation/reassembly processing unit 7-2, network processing units 7-3, arrival time calculation unit 7-4, and arrival time notification unit 7-5.

The application processing unit 7-1 processes an arbitrary application program. In transmitting data, the application processing unit 7-1 sends data to the data segmentation/reassembly processing unit 7-2. In receiving data, the application processing unit 7-1 receives data from the data segmentation/reassembly processing unit 7-2.

In transmitting data, the data segmentation/reassembly processing unit 7-2 receives data from the application processing unit 7-1, segments the received data into an arbitrary number of blocks, and adds reassembly information to the top of each block. Then, the data segmentation/reassembly processing unit 7-2 inquires of the arrival time calculation unit 7-4 about which one of a plurality of TCP connections has the shortest data arrival time to the apparatus of the transmission destination and instructs the network processing unit 7-3 to transmit the blocks by using the TCP connection selected by the arrival time calculation unit 7-4. In receiving data, the data segmentation/reassembly processing unit 7-2 identifies the segmented blocks by referring to reassembly information stored at the top of each of the data of the plurality of TCP connections received from the network processing unit 7-3, reassembles the data before segmentation by combining the plurality of blocks, and sends the reassembled data to the application processing unit 7-1.

Each network processing unit 7-3 establishes a connection. In transmitting data, the network processing unit 7-3 outputs data received from the data segmentation/reassembly processing unit 7-2 to the network by using a TCP connection received from the data segmentation/reassembly processing unit 7-2. In receiving data, the network processing unit 7-3 sends data of a TCP connection received from the network to the data segmentation/reassembly processing unit 7-2.

The arrival time calculation unit 7-4 calculates the data arrival time from the apparatus 7 to the reception terminal for each block and each TCP connection on the basis of the data arrival time from one of a plurality of communication apparatuses between the transmission terminal and the reception terminal on the network, which is located at the subsequent stage of the apparatus 7, to the reception terminal, which arrival time is received from the communication apparatus of the subsequent stage, and the transmission queue length and path delay of each TCP connection established by the network processing unit 7-3. The arrival time calculation unit 7-4 selects a TCP connection with the shortest arrival time from the plurality of TCP connections. In addition, the arrival time calculation unit 7-4 notifies the arrival time notification unit 7-5 of the arrival time when the selected TCP connection is used and also notifies the data segmentation/reassembly processing unit 7-2 of the selected TCP connection.

Figure 12:
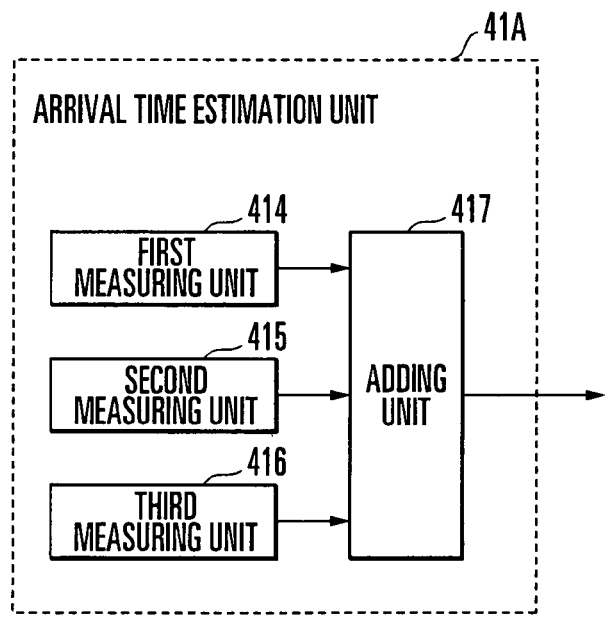
FIG. 12 is a block diagram showing an arrangement example of an arrival time estimation unit according to the second embodiment of the present invention.

As in the first embodiment, the arrival time calculation unit 7-4 also has an arrival time estimation unit and a connection selection unit. As shown in FIG. 12, an arrival time estimation unit 41A includes a first measuring unit 414, second measuring unit 415, third measuring unit 416, and adding unit 417. The first measuring unit 414 measures a first time after a block is distributed to the connection selected by the connection selection unit until the block is output to the network. The second measuring unit 415 measures a second time after a block is output to the network until the block arrives at the transit apparatus on the receiving side of the connection. The third measuring unit 416 measures a third time unit a block from the transit apparatus arrives at the reception terminal. The adding unit 417 adds the first, second, and third times to estimate the arrival time. When the transit apparatus notifies the apparatus 7 of the arrival time until the block from the transit apparatus arrives at the reception terminal, the third measuring unit 416 obtains the received arrival time as the third time.

The arrival time notification unit 7-5 notifies one of a plurality of communication apparatuses between the transmission terminal and the reception terminal on the network, which is located at the preceding stage of the apparatus 7, of the arrival time received from the arrival time calculation unit 7-4.

An example of how to determine which one of the plurality of TCP connections should be used will be described next. When data is to be transmitted from the transmission terminal to the reception terminal, the arrival time calculation unit 7-4 of each communication apparatus on the path from the transmission terminal to the reception terminal calculates, for each block and each TCP connection, a data arrival time T(i) from the apparatus 7 to the reception terminal when the data is transmitted by using a TCP connection established between the apparatus 7 and the communication apparatus of the subsequent stage. The arrival time calculation unit 7-4 determines to transmit the data by using a TCP connection having the shortest arrival time T(i), i.e., a TCP connection determined to make the data arrive at the reception terminal fastest.

$$T(i) = \frac{Q}{Thr} + \frac{sRTT}{2} + T(i-1) \quad (2)$$

where Q is the size of data stored in the transmission queue of the data segmentation/reassembly processing unit 7-2 of the apparatus 7, Thr is the effective throughput of TCP (a throughput output from TCP to an adjacent protocol, i.e., a data size processible within a unit time), sRTT is a smoothed RTT (packet round-trip delay between the apparatus 7 and the communication apparatus of the subsequent stage), and T(i-1) is the data arrival time from the communication apparatus of the subsequent stage to the reception terminal, which is received from the communication apparatus of the subsequent stage. On the right-hand side of equation (2), obtaining Q/Thr indicates obtaining, on the basis of the measurement values Q and Thr, the first time after a block is distributed to a TCP connection until the block is output to the network. Obtaining sRTT/2 indicates obtaining, on the basis of the measurement value sRTT, the second time after a block is output to the network until the block arrives at the communication apparatus of the subsequent stage. The arrival time calculation unit 7-4 calculates the arrival time T(i-1) received from the communication apparatus of the subsequent stage as the third time. The first time can also be obtained by using the transmission waiting time of each connection in place of Q.

Figure 13:
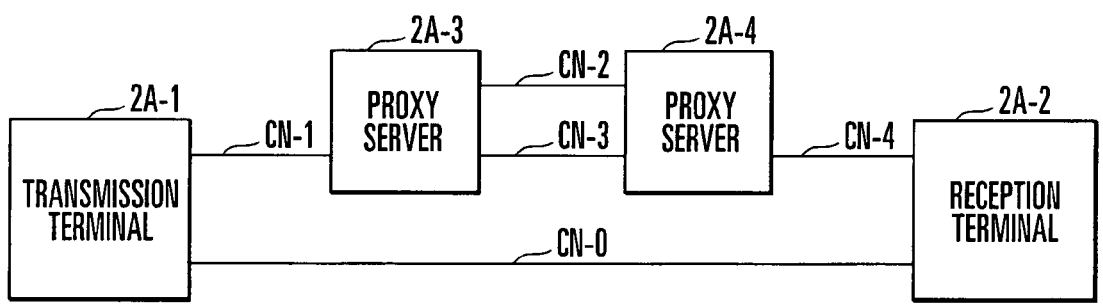
FIG. 13 is a view showing the flow of data between a transmission terminal and a reception terminal according to the second embodiment of the present invention.

FIG. 13 shows the flow of data from a transmission terminal 2A-1 to a reception terminal 2A-2 according to this embodiment. Each of the transmission terminal 2A-1, reception terminal 2A-2, and proxy servers 2A-3 and 2A-4 is formed from the communication apparatus 7 shown in FIG. 11. In this embodiment, as shown in FIG. 13, communication between the transmission terminal 2A-1 and the reception terminal 2A-2 through the proxy servers 2A-3 and 2A-4 will be described. In the application processing unit 7-1 of each of the proxy servers 2A-3 and 2A-4, a proxy server to implement communication between the transmission terminal 2A-1 and the reception terminal 2A-2 operates. Data sent from the transmission terminal 2A-1 is sent to the reception terminal 2A-2 through TCP connections CN-0 to CN-4. The processing in each apparatus is the same as in the first embodiment. Different points will be described below.

The arrival time calculated by the arrival time calculation unit 7-4 of the reception terminal 2A-2 is 0. The arrival time notification unit 7-5 of the reception terminal 2A-2 notifies the proxy server 2A-4 and transmission terminal 2A-1 as communication apparatuses of the preceding stage of the arrival time T(0)=0.

The arrival time calculation unit 7-4 of the proxy server 2A-4 calculates, for the TCP connection CN-4, the data arrival time T(1) from the server 2A-4 to the reception terminal on the basis of the arrival time T(0)=0 received from the reception terminal 2A-2 of the subsequent stage, the transmission queue length Q and TCP effective throughput Thr of the TCP connection CN-4 established between the server 2A-4 and the reception terminal 2A-2, and sRTT between the server 2A-4 and the reception terminal 2A-2. On the basis of equation (2), this calculation is done by $$T(1) = \frac{Q}{Thr} + \frac{sRTT}{2} + 0 \quad (3)$$

The arrival time notification unit 7-5 of the proxy server 2A-4 notifies the proxy server 2A-3 as the communication apparatus of the preceding stage of the arrival time T(1) calculated by the arrival time calculation unit 7-4. Since only the TCP connection CN-4 is present at this time, the arrival time calculation unit 7-4 of the proxy server 2A-4 notifies, as the selected connection, the data segmentation/reassembly processing unit 7-2 of the apparatus of the TCP connection CN-4.

The arrival time calculation unit 7-4 of the proxy server 2A-3 calculates, for each of the TCP connections CN-2 and CN-3, the data arrival time from the server 2A-3 to the reception terminal on the basis of the arrival time T(1) received from the proxy server 2A-4 of the subsequent stage, the transmission queue length Q and TCP effective throughput Thr of each of the TCP connections CN-2 and CN-3 established between the server 2A-3 and the proxy server 2A-4, and sRTT between the server 2A-3 and the proxy server 2A-4. Let Tconn2(2) be the arrival time for the TCP connection CN-2, and Tconn3(2) be the arrival time for the TCP connection CN-3. The arrival time notification unit 7-5 of the proxy server 2A-3 notifies the transmission terminal 2A-1 of a smaller one of Tconn2(2) and Tconn3(2) as the arrival time T(2). The arrival time calculation unit 7-4 of the proxy server 2A-3 selects the TCP connection with the shorter arrival time and notifies the data segmentation/reassembly processing unit 7-2 of the apparatus of the TCP connection.

The arrival time calculation unit 7-4 of the transmission terminal 2A-1 calculates, for the TCP connection CN-0, the data arrival time from the apparatus to the reception terminal on the basis of the arrival time T(0)=0 received from the reception terminal 2A-2, the transmission queue length Q and TCP effective throughput Thr of the TCP connection CN-0 established between the terminal 2A-1 and the reception terminal 2A-2, and sRTT between the terminal 2A-1 and the reception terminal 2A-2. The arrival time calculation unit 7-4 also calculates, for the TCP connection CN-1, the data arrival time from the terminal 2A-1 to the reception terminal on the basis of the arrival time T(2) received from the proxy server 2A-3, the transmission queue length Q and TCP effective throughput Thr of the TCP connection CN-1 established between the terminal 2A-1 and the proxy server 2A-3, and sRTT between the terminal 2A-1 and the proxy server 2A-3. The arrival time calculation unit 7-4 of the transmission terminal 2A-1 selects the TCP connection with the shorter arrival time and notifies the data segmentation/reassembly processing unit 7-2 of the terminal 2A-1 of the TCP connection.

The data segmentation/reassembly processing unit 7-2 of each of the transmission terminal 2A-1 and proxy servers 2A-3 and 2A-4 instructs the network processing unit 7-3 of the corresponding terminal or server to transmit data by using the TCP connection received from the arrival time calculation unit 7-4 of the corresponding terminal or server.

With the above procedures, each of the transmission terminal 2A-1 and proxy servers 2A-3 and 2A-4 can transfer data while selecting the TCP connection with the shortest arrival time.

As described above, in the communication method according to this embodiment, since the path delay of the subsequent stage is fed back to the preceding stage between the terminals and proxy servers related to communication, data can be transmitted fastest.

Transmission data is segmented into blocks by the transmission terminal 2A-1. Hence, the data segmentation/reassembly processing units 7-2 of the proxy servers 2A-3 and 2A-4 do not execute data segmentation/reassembly processing.

Third Embodiment

Figure 14:
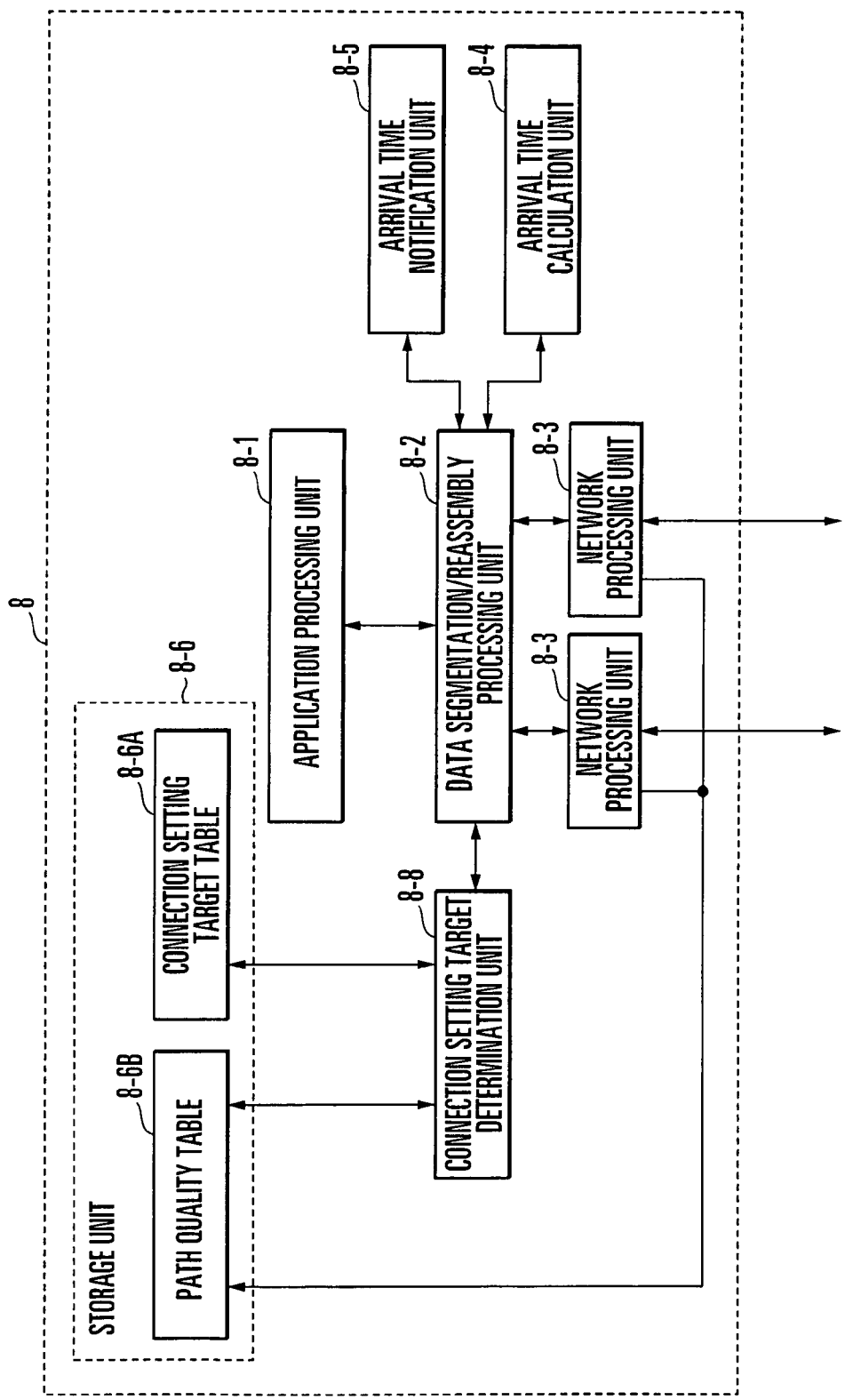
FIG. 14 is a block diagram showing an arrangement example of a communication apparatus according to the third embodiment of the present invention.
Figure 15:
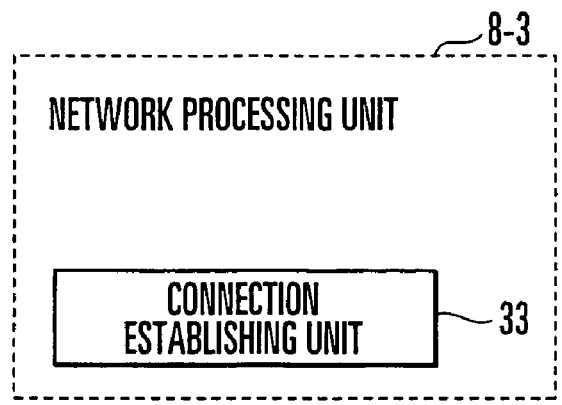
FIG. 15 is a block diagram showing a network processing unit according to the third embodiment of the present invention.

The third embodiment of the present invention will be described next. FIG. 14 shows the arrangement of a communication apparatus according to the third embodiment of the present invention. A communication apparatus 8 of this embodiment includes a storage unit 8-6 and a connection setting target determination unit 8-8 in addition to an application processing unit 8-1, data segmentation/reassembly processing unit 8-2, network processing units 8-3, arrival time calculation unit 8-4, and arrival time notification unit 8-5 which are the same as in the second embodiment. The storage unit 8-6 stores a connection setting target table 8-6A and path quality table 8-6B. The connection setting target determination unit 8-8 determines a connection setting target by using the connection setting target table 8-6A and path quality table 8-6B. As shown in FIG. 15, each network processing unit 8-3 has a connection establishing unit 33 which establishes a connection in accordance with determination by the connection setting target determination unit 8-8. The connection setting target table 8-6A stores the address and priority of a connection setting target for each reception terminal address. The path quality table 8-6B stores the quality of a path to each connection setting target.

In the second embodiment, since the paths between communication apparatuses are uniquely defined, a destination is set in advance for the network processing unit of each communication apparatus. In the third embodiment, since the path changes for each reception terminal, the setting target of a connection to be set for the network processing unit 8-3 of each communication apparatus 8 is set at the start of communication between the transmission terminal and the reception terminal. The operation after the start of transmission is the same as in the second embodiment. Connection target setting processing at the start of transmission will be described below.

The application processing unit 8-1 of the communication apparatus 8 serving as the transmission terminal instructs the data segmentation/reassembly processing unit 8-2 to start new communication. The data segmentation/reassembly processing unit 8-2 of the transmission terminal notifies the connection setting target determination unit 8-8 of the address of the reception terminal and inquires about the connection setting target.

In response to the inquiry from the data segmentation/reassembly processing unit 8-2, the connection setting target determination unit 8-8 acquires one or a plurality of sets of addresses and priorities of connection setting targets corresponding to the received reception terminal address by looking up the connection setting target table 8-6A. Table 1 shows an example of the connection setting target table 8-6A.

TABLE 1

Connection Setting Target Table 8-6A

| Reception Terminal Address | Connection Setting Target, Priority |
|---|---|
| 1.2.3.4 | 10.11.12.13: 1 |
| 2.3.4.x | 11.12.13.14: 2 |
|  | 12.13.14.15: 2 |
|  | 13.14.15.16: 3 |
| 3.4.5.6 | 10.11.12.13: 1 |
|  | 13.14.15.16: 2 |
| 4.5.6.7 | 20.21.22.23: 1 |
|  | 21.22.23.24: 2 |

In this embodiment, the address and priority of a connection setting target are registered in the connection setting target table 8-6A for each reception terminal address. However, the present invention is not limited to this. The address and priority of a connection setting target may be registered in the connection setting target table 8-6A in correspondence with the subnet to which the reception terminal belongs, the address of the transmission terminal, the subnet to which the transmission terminal belongs, the application type, the type of data to be transmitted, or the port number to be used by the application. With such setting of the connection setting target table 8-6A, for example, the load can be distributed by using different connections for different transmission terminals, or communication can be distributed by using different connections for applications that require different qualities.

When a plurality of sets of addresses and priorities of connection setting targets are acquired from the connection setting target table 8-6A, the connection setting target determination unit 8-8 defines them as connection setting target candidates. The path quality table 8-6B is looked up on the basis of the plurality of acquired candidate addresses, and the communication quality of the path to each candidate is acquired. Table 2 shows an example of the path quality table 8-6B.

TABLE 2

Path Quality Table 8-6B

| Connection Setting Target | Path Quality |
|---|---|
| 10.11.12.13 | 3 |
| 11.12.13.14 | 1 |
| 12.13.14.15 | 10 |
| 13.14.15.16 | 7 |

The connection setting target determination unit 8-8 determines the connection setting target from the plurality of candidates on the basis of the priorities and path quality information of the plurality of candidates and notifies the data segmentation/reassembly processing unit 8-2 of the connection setting target. On the basis of this notification, the data segmentation/reassembly processing unit 8-2 requests the network processing unit 8-3 to establish a new connection. The network processing unit 8-3 transmits the packet of the connection establishment request to the connection setting target, thereby establishing a connection. When the connection is established, the transmission terminal starts communication.

In this embodiment, the transmission terminal can dynamically establish a connection in, e.g., the following way. The transmission terminal sets a connection for one connection setting target with the highest priority or each of a plurality of connection setting targets of the connection setting targets described in the connection setting target table 8-6A and executes communication by using these connections. At this time, one or a plurality of connections may be set by selecting only connection setting targets whose path qualities are higher than a predetermined threshold value of quality. Alternatively, connections may be set by selecting only one connection setting target with the highest path quality.

After the start of transmission and the elapse of a predetermined communication time, other connections may be added to execute communication by using a larger number of connections simultaneously. In this case, the connection setting target determination unit 8-8 selects one or a plurality of connection setting targets with the second highest priority next to the selected connection setting targets. Connections are established to these connection setting targets, and communication is executed by using these connections, too. At this time, one or a plurality of connections may be set additionally by selecting only connection setting targets whose path qualities are higher than a predetermined threshold value of quality. Alternatively, connections may be set additionally by electing only one connection setting target with the highest path quality.

Figure 16:
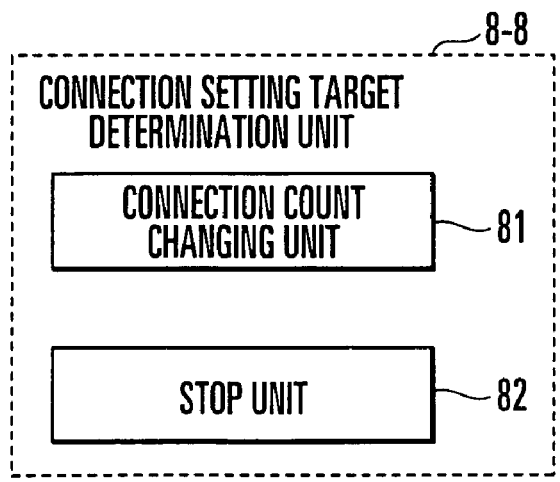
FIG. 16 is a block diagram showing an arrangement example of a connection setting target determination unit according to the third embodiment of the present invention.

The processing of changing the number of connections in use in accordance with the duration from the start of communication can be executed by a connection count changing unit 81 of the connection setting target determination unit 8-8 shown in FIG. 16.

The connection setting target determination unit 8-8 may execute communication by using a connection setting target with a lower priority every time a predetermined communication time or more elapses. When the path quality of a specific connection decreases or the number of connections in use is equal to or larger than a predetermined number during communication, the connection setting target determination unit 8-8 may disconnect a connection with the lowest path quality and continue communication by using the remaining connections. The processing of stopping use of a connection with the lowest path quality can be executed by a stop unit 82 of the connection setting target determination unit 8-8 shown in FIG. 16.

During communication using the connections, the path quality table 8-6B is appropriately updated to the up-to-the-minute state by causing a communication quality measuring unit 32 of the network processing unit 8-3 to measure the communication quality of each connection. In the path quality table 8-6B, the same path quality information can be shared by a plurality of communications. When new communication starts, or existing communication additionally sets a new connection, the connection setting target determination unit 8-8 looks up the path quality table 8-6B in advance so that the quality of the path can be confirmed even before the start of communication.

As described in the first embodiment, the communication quality of each connection is determined by the round-trip propagation delay time of a connection, the packet round-trip delay time (RTT), the packet round-trip delay time change rate, the TCP effective throughput, the packet loss rate, the link band on the path, the free band on the path, or the usable band on the path. The communication quality may be measured by combining these factors. When the arrival time notification unit 8-5 notifies the communication apparatus of the preceding stage of the state of the path of the subsequent stage, not the communication quality to the connection setting target but the total communication quality of the path to the reception terminal can be used.

Fourth Embodiment

Figure 17:
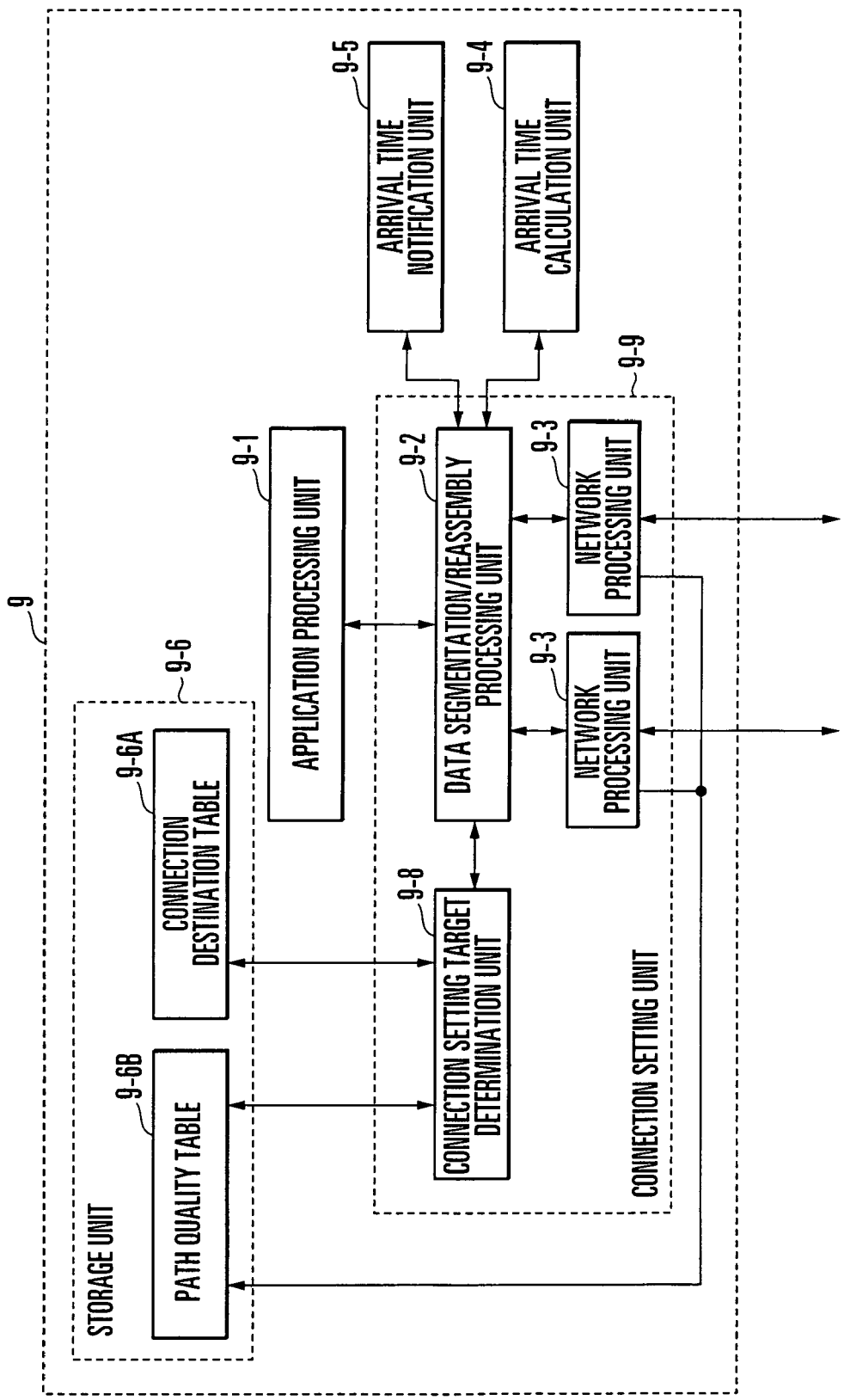
FIG. 17 is a block diagram showing an arrangement example of a communication apparatus according to the fourth embodiment of the present invention.

The fourth embodiment of the present invention will be described next. FIG. 17 shows the arrangement of a communication apparatus according to the fourth embodiment of the present invention. A communication apparatus 9 of this embodiment includes a storage unit 9-6 and a connection setting target determination unit 9-8 in addition to an application processing unit 9-1, data segmentation/reassembly processing unit 9-2, network processing units 9-3, arrival time calculation unit 9-4, and arrival time notification unit 9-5 which are the same as in the second embodiment. The storage unit 9-6 stores a connection destination table 9-6A and path quality table 9-6B. The connection setting target determination unit 9-8 determines a connection setting target by using the connection destination table 9-6A and path quality table 9-6B. As in the third embodiment, each network processing unit 9-3 has a connection establishing unit which establishes a connection in accordance with determination by the connection setting target determination unit 9-8. The connection destination table 9-6A stores the address and priority of a connection setting target for each reception terminal address or each address of a proxy server used for transit. The path quality table 9-6B stores the quality of a path to each connection setting target.

Even in this embodiment, since the path between communication apparatuses changes for each reception terminal, as in the third embodiment, the setting target of a connection to be set for the network processing unit 9-3 of each communication apparatus 9 is set at the start of communication between the transmission terminal and the reception terminal. In this embodiment, however, a connection setting target is set for not all reception terminals but only a reception terminal with which the transmission terminal can directly communicate without intervening any proxy server, unlike the third embodiment. Additionally, in this embodiment, a connection setting target is set for a proxy server with which the transmission terminal can directly communicate without intervening another proxy server. For these reasons, in this embodiment, many reception terminal addresses need not be managed. The operation after the start of transmission is the same as in the second embodiment. Connection target setting processing at the start of transmission will be described below.

The application processing unit 9-1 of the communication apparatus 9 serving as the transmission terminal instructs the data segmentation/reassembly processing unit 9-2 to start new communication. The data segmentation/reassembly processing unit 9-2 of the transmission terminal notifies the connection setting target determination unit 9-8 of the address of a reception terminal capable of directly communicating without intervening any proxy server or the address of a proxy server capable of directly communicating and inquires about the connection setting target.

In response to the inquiry from the data segmentation/reassembly processing unit 9-2, the connection setting target determination unit 9-8 acquires one or a plurality of sets of addresses and priorities of connection setting targets corresponding to the received reception terminal address or proxy server address by looking up the connection destination table 9-6A. Table 3 shows an example of the connection destination table 9-6A.

TABLE 3

Connection Destination Table 9-6A

| Reception Terminal Address, 1-Hop Proxy Address | Connection Setting Target, Priority |
| --- | --- |
| 10.11.12.13 | 11.12.13.14: 2 |
|  | 12.13.14.15: 2 |
|  | 13.14.15.16: 3 |
| 20.21.22.23 | 21.22.23.24: 2 |

If the connection setting target is registered in the connection destination table 9-6A, the subsequent operations of the connection setting target determination unit 9-8, path quality table 9-6B, data segmentation/reassembly processing unit 9-2, and network processing unit 9-3 are the same as in the third embodiment. That is, after connection establishment processing is executed, communication is started.

On the other hand, if the connection setting target is not registered in the connection destination table 9-6A, i.e., if the connection setting target cannot be specified, the connection setting target determination unit 9-8 notifies the data segmentation/reassembly processing unit 9-2 of the reception terminal as the data transmission destination as the connection setting target. On the basis of this notification, the data segmentation/reassembly processing unit 9-2 requests the network processing unit 9-3 to establish a new connection.

Hence, the network processing unit 9-3 transmits the packet of the connection establishment request to the reception terminal. In this case, a proxy server is always present between the transmission terminal and the reception terminal. In place of the reception terminal, the network processing unit 9-3 of the proxy server receives the packet of the connection establishment request. In place of the reception terminal, the network processing unit 9-3 of the proxy server transmits a response packet to the connection establishment request to the transmission terminal. At this time, the network processing unit 9-3 of the proxy server describes the address of the proxy server in the response packet as the address of the connection setting target. In addition, the network processing unit 9-3 of the proxy server transmits the packet of the connection establishment request to the reception terminal by regarding the proxy server as the connection setting request source.

Upon receiving the response packet from the proxy server, the network processing unit 9-3 of the transmission terminal changes the connection target to be set from the reception terminal to the proxy server described in the response packet and completes the connection establishment processing.

The connection setting target determination unit 9-8 of the transmission terminal searches the connection destination table 9-6A by using the received proxy server address. If a connection setting target corresponding to the address of the proxy server is registered in the connection destination table 9-6A, a plurality of connections can be set for the proxy server by the same processing as in the third embodiment.

As described above, in this embodiment, when a proxy server is present between the transmission terminal and the reception terminal, one or a plurality of connections can be set between the transmission terminal and the proxy server. The proxy server sets one or a plurality of connections to the reception terminal or another proxy server which is present between the proxy server and the reception terminal by executing the same processing as that of the transmission terminal. When this operation is repeated until the reception terminal, a plurality of connections through proxy servers can be set between the transmission terminal and the reception terminal, and communication can be started by using these connections.

In the proxy server which receives the packet of the connection establishment request from the transmission terminal in place of the reception terminal, a connection setting unit 9-9 including the connection setting target determination unit 9-8, data segmentation/reassembly processing unit 9-2, and network processing units 9-3 may set a connection to another setting target, which belongs to the same group as the connection setting target indicated by the packet of the connection establishment request, on the basis of the contents of the connection destination table 9-6A.

In the first to fourth embodiments, the data segmentation/reassembly processing unit 1-2, 7-2, 8-2, or 9-2 may select a connection to output for every packet, every predetermined data amount, or every data amount that forms a cluster for the upper layer (application layer).

In the first to fourth embodiments, the arrival time estimation unit 41 estimates the arrival time until a block from the communication apparatus arrives at the final reception terminal. Instead, the arrival time estimation unit may estimate, for each block and each of a plurality of connections, the arrival time until a block from the communication apparatus arrives at a merging apparatus.

In the first to fourth embodiments, the communication apparatus 1, 7, 8, or 9 can be implemented by a computer including, e.g., a CPU, storage device, and interface and a program to control the hardware resources. In this computer, a data communication program to implement the data communication method of the present invention is provided while being recorded in a recording medium such as a flexible disk, CD-ROM, DVD-ROM, or memory card. The CPU writes the read program in the storage device and executes the processing described in the first to fourth embodiments.

As described above, in the present invention, in the transmission terminal, the delay until data arrives at the reception terminal by using each path is taken into consideration. The time after data is stored in the TCP transmission queue of the transmission terminal until the data is actually sent and the delay time necessary for the data to be transferred through the path from the transmission terminal to the reception terminal are calculated for each path. The data is sent by using a path in which the data is transferred to the reception terminal fastest. The data arrive at the reception terminal in the same order as that of transmission from the transmission terminal. The time required to arrange the data arriving from the respective paths in order can be shortened, and a high transmission rate can be obtained. Especially, if short data is transmitted by using a slow path, the time required for data arrangement in the reception terminal poses a problem, resulting in a large degradation in performance. In the present invention, however, high performance can be obtained.

Since the buffer amount necessary for arranging the data arriving from the respective paths can be decreased in the reception terminal, the cost can be reduced. The cost reduction effect is especially large when a number of connections are handled.

In the present invention, the transmission queue length of the transmission terminal and the effective throughput of the communication protocol are taken into consideration in calculating the arrival time. When the time after data is stored in the transmission queue of the transmission terminal until the data is actually sent is calculated on the basis of the TCP effective throughput, the arrival time can be calculated more accurately, and the above-described effect can further be enhanced. This is particularly effective in a widely used protocol such as TCP with large overhead.

In the present invention, in sending blocks obtained by segmenting data by using a plurality of paths, the time until each block arrives at the reception terminal is calculated, thereby determining a path to be used. With this arrangement, each block can arrive at the reception terminal fastest, and high communication performance can be obtained.

The present invention can be applied to a communication apparatus which executes communication while distributing data to a plurality of connections.

What is claimed is:

1. A communication apparatus comprising:
   network processing units, wherein each network processing unit establishes a logical communication protocol connection and sends and receives a block generated by segmenting transmission data via the logical communication protocol connection;
   an arrival time estimation unit which estimates, for each block and each of the connections established by said network processing units, an arrival time of the block, from the apparatus, at one of a final reception terminal and a merging apparatus through a network; and
   a connection selection unit which selects, for each block, a logical communication protocol connection with a shortest arrival time from the connections established by said network processing units on the basis of an estimation result by said arrival time estimation unit,
   wherein each of said network processing units outputs each block to the network by using the connection selected by said connection selection unit,
   wherein the arrival time estimation unit includes a first measuring unit which measures a first time after the block is distributed to the connection selected by said connection selection unit until the block is output to the network; and
   wherein said first measuring unit measures, for each block and each of the plurality of connections, the first time on the basis of:
   one of: a transmission queue length and a transmission wait time of each connection and
   an effective throughput of a communication protocol on each connection, wherein the effective throughput is a throughput output from TCP to a protocol adjacent to TCP.

2. An apparatus according to claim 1, wherein said arrival time estimation unit comprises
   a second measuring unit which measures a second time after the block is output to the network until the block arrives at one of the reception terminal and the merging apparatus, and
   an adding unit which adds the first time and the second time to estimate the arrival time when the apparatus is a transmission terminal.

3. An apparatus according to claim 1, wherein said arrival time estimation unit comprises
   a second measuring unit which measures a second time after the block is output to the network until the block arrives at a transit apparatus on a receiving side of the selected connection,
   a third measuring unit which measures a third time until the block arrives from the transit apparatus at one of the reception terminal and the merging apparatus, and
   an adding unit which adds the first time, the second time, and the third time to estimate the arrival time when the transit apparatus is present between the apparatus and one of the reception terminal and the merging apparatus.

4. An apparatus according to claim 3, further comprising a notification unit which notifies an apparatus located on a transmitting side of the connection selected by said connection selection unit of the arrival time estimated by said arrival time estimation unit,
   wherein said third measuring unit obtains the received arrival time as the third time when said notification unit of the transit apparatus notifies the apparatus of the arrival time until the block arrives from the transit apparatus at one of the reception terminal and the merging apparatus.

5. An apparatus according to claim 1, further comprising
   a connection setting target determination unit which determines a connection setting target before selection of the connection in accordance with one of an address of the reception terminal, a subnet to which the reception terminal belongs, an address of a transmission terminal, a subnet to which the transmission terminal belongs, an application type, a type of data to be transmitted, and a port number to be used by the application, and
   a connection establishing unit which establishes the logical communication protocol connection in accordance with the determination by said connection setting target determination unit.

6. An apparatus according to claim 5, wherein said connection setting target determination unit determines, on the basis of a priority of each candidate and a communication quality of a path to each candidate, the connection setting target from a plurality of candidates corresponding to one of the address of the reception terminal, the subnet to which the reception terminal belongs, the address of the transmission terminal, the subnet to which the transmission terminal belongs, the application type, the type of data to be transmitted, and the port number to be used by the application.

7. An apparatus according to claim 1, further comprising
   a storage unit which stores a plurality of connection setting targets corresponding to a data transmission destination,
   a connection setting target determination unit which determines, before selection of the connection by said connection selection unit, a connection setting target corresponding to the data transmission destination by using contents stored in said storage unit, and when the connection setting target cannot be specified from the contents stored in said storage unit, determines the data transmission destination as the connection setting target, and a connection establishing unit which establishes the logical communication protocol connection in accordance with determination by said connection setting target determination unit.

8. An apparatus according to claim 7, wherein when the apparatus is an apparatus present between a connection setting request source and the connection setting target, and a connection setting request packet transmitted from said connection establishing unit of the connection setting request source is received in place of the connection setting target, each of said network processing units transmit, to the connection setting request source, an address of the apparatus as an address of the connection setting target.

9. An apparatus according to claim 7, wherein when the apparatus is an apparatus present between a connection setting request source and the connection setting target, and a connection setting request packet transmitted from said connection establishing unit of the connection setting request source is received in place of the connection setting target, each of said network processing unit transmits the connection setting request packet to the connection setting target by regarding the apparatus as the connection setting request source.

10. An apparatus according to claim 1, further comprising a storage unit which stores a plurality of connection setting targets corresponding to a data transmission destination, a connection setting target determination unit which determines, before selection of the connection by said connection selection unit, a plurality of connection setting targets corresponding to the data transmission destination by using contents stored in said storage unit, and a connection establishing unit which establishes a connection in accordance with determination by said connection setting target determination unit.

11. An apparatus according to claim 1, further comprising a storage unit which stores a plurality of connection setting targets corresponding to a data transmission destination when the apparatus is an apparatus present between a connection setting request source and the connection setting target, and a connection setting unit which sets a connection to another setting target, which belongs to the same group as the connection setting target indicated by a connection setting request packet, on the basis of contents stored in said storage unit when the connection setting request packet transmitted from the connection setting request source is received in place of the connection setting target.

12. An apparatus according to claim 1, further comprising a path failure detection unit which detects a failure in each path, and a communication quality measuring unit which measures a communication quality of each path, wherein when a failure occurs in a path used by a connection and when communication performance of a connection is degraded, said connection selection unit selects to transmit a block in a transmission wait state in the connection by using another connection.

13. An apparatus according to claim 12, wherein when one of the connections is set in a retransmission timeout state not less than a predetermined number of times, said path failure detection unit determines that a failure occurs in the path used by the connection.

14. An apparatus according to claim 12, wherein when one of a packet round-trip delay time of a connection, a packet round-trip delay time change rate, an effective throughput of a communication protocol, a packet loss rate, a link band on a path, a free band on a path, and a usable band on a path is less than a threshold value, said communication quality measuring unit determines that the communication performance of the connection is degraded.

15. An apparatus according to claim 12, wherein said communication quality measuring unit comprises an average communication quality measuring unit which measures an average communication quality of all of the connections, and a comparison unit which compares the average communication quality measured by said average communication quality measuring unit with the communication quality of each of the connections, and when a connection whose communication quality is lower than the average communication quality by more than a predetermined ratio is present, determines that the communication performance of the connection is degraded.

16. An apparatus according to claim 1, further comprising a stop unit which stops use of a connection with a lowest communication quality when the number of the connections in use for communication is not less than a predetermined number.

17. An apparatus according to claim 1, further comprising a connection count changing unit which changes the number of connections in use in accordance with a duration from a start of communication.

18. An apparatus according to claim 1, wherein said connection selection unit selects the connection to output for every packet, every predetermined data amount, or every data amount that forms a cluster for an upper layer.

19. A data communication method being implemented by a data communication apparatus, the data communication method comprising:

a procedure for network processing units, wherein each network processing unit establishes a logical communication protocol connection and sends and receives a block generated by segmenting transmission data via the connection;

a procedure of estimating, for each block and each of the connections established by said processing units, an arrival time of the block from the data communication apparatus, at one of a final reception terminal and a merging apparatus through a network;

a procedure of selecting, for each block, a logical communication protocol connection with a shortest arrival time from the connections established by the network processing units on the basis of an estimation result; and a procedure of outputting each block from each of said network processing units from a transmission terminal of the data communication apparatus to the network by using the selected connection, wherein the procedure of selecting the logical communication protocol connection with the shortest arrival time includes a procedure for measuring a first time after the block is distributed to the connection until the block is output to the network; and wherein in the first time measuring procedure, the first time is measured, for each block and each of the plurality of connections, on the basis of:

one of a transmission queue length and a transmission wait time of each connection, and an effective throughput of a communication protocol on each connection, wherein the effective throughput is a throughput output from TCP to a protocol adjacent to TCP.

20. A method according to claim 19, wherein the estimation procedure comprises
a procedure of measuring a second time after the block is output to the network until the block arrives at one of the reception terminal and the merging apparatus, and
a procedure of adding the first time and the second time to estimate the arrival time.

21. A method according to claim 19, wherein the estimation procedure comprises
a procedure of measuring a second time after the block is output to the network until the block arrives at a transit apparatus on a receiving side of the selected connection,
a procedure of measuring a third time until the block arrives from the transit apparatus at one of the reception terminal and the merging apparatus, and
a procedure of adding the first time, the second time, and the third time to estimate the arrival time.

22. A method according to claim 21, further comprising a procedure of notifying an apparatus located on a transmitting side of the connection selected by the selection procedure of the arrival time until the block arrives from the transit apparatus at one of the reception terminal and the merging apparatus, which is estimated by the estimation procedure in the transit apparatus,
wherein in the apparatus located on the transmitting side, in the third time measuring procedure, the arrival time received from the transit apparatus is obtained as the third time.

23. A method according to claim 19, further comprising
a procedure of determining a connection setting target before selection of the connection in accordance with one of an address of the reception terminal, a subnet to which the reception terminal belongs, an address of a transmission terminal, a subnet to which the transmission terminal belongs, an application type, a type of data to be transmitted, and a port number to be used by the application, and
a procedure of establishing the logical communication protocol connection in accordance with determination of the logical communication protocol connection setting target.

24. A method according to claim 23, wherein in the determination procedure, the connection setting target is determined, on the basis of a priority of each candidate and a communication quality of a path to each candidate, from a plurality of candidates corresponding to one of the address of the reception terminal, the subnet to which the reception terminal belongs, the address of the transmission terminal, the subnet to which the transmission terminal belongs, the application type, the type of data to be transmitted, and the port number to be used by the application.

25. A method according to claim 19, further comprising
a procedure of determining, before selection of the connection, a connection setting target corresponding to a data transmission destination by using information of a plurality of connection setting targets registered in advance in correspondence with the data transmission destination, and
a procedure of establishing the logical communication protocol connection in accordance with determination of the connection setting target.

26. A method according to claim 19, further comprising
a procedure of determining, before selection of the connection, a data transmission destination as the connection setting target, when the connection setting target corresponding to the data transmission destination cannot be specified from information of a plurality of connection setting targets registered in advance in correspondence with the data transmission destination, and
a procedure of establishing the logical communication protocol connection in accordance with determination of the connection setting target.

27. A method according to claim 26, further comprising
in an apparatus present between a connection setting request source and the connection setting target,
a procedure of receiving a connection setting request packet transmitted from the connection setting request source in place of the connection setting target, and
a procedure of transmitting, to the connection setting request source, an address of the apparatus as an address of the connection setting target.

28. A method according to claim 26, further comprising
in an apparatus present between a connection setting request source and the connection setting target,
a procedure of receiving a connection setting request packet transmitted from the connection setting request source in place of the connection setting target, and
a procedure of transmitting the connection setting request packet to the connection setting target by regarding the apparatus as the connection setting request source.

29. A method according to claim 19, further comprising
a procedure of determining, before selection of the connection, a plurality of connection setting targets corresponding to a data transmission destination by using information of a plurality of connection setting targets registered in advance in correspondence with the data transmission destination, and
a procedure of establishing the logical communication protocol connection in accordance with determination of the connection setting target.

30. A method according to claim 19, further comprising
in an apparatus present between a connection setting request source and a connection setting target,
a procedure of receiving a connection setting request packet transmitted from the connection setting request source in place of the connection setting target, and
a procedure of setting a connection to another setting target, which belongs to the same group as the connection setting target indicated by the connection setting request packet, by using information of a plurality of connection setting targets registered in advance in correspondence with the data transmission destination.

31. A method according to claim 19, further comprising
a procedure of detecting a failure in each path, and
a procedure of measuring a communication quality of each path,
wherein in the selection procedure, when a failure occurs in a path used by a connection and when communication performance of a connection is degraded, selection is done to transmit a block in a transmission wait state in the connection by using another connection.

32. A method according to claim 31, wherein in the detection procedure, when one of the connections is set in a retransmission timeout state not less than a predetermined number of times, it is determined that a failure occurs in the path used by the connection.

33. A method according to claim 31, wherein in the communication quality measuring procedure, when one of a packet round-trip delay time of a connection, a packet round-trip delay time change rate, an effective throughput of a communication protocol, a packet loss rate, a link band on a path, a free band on a path, and a usable band on a path is less than a threshold value, it is determined that the communication performance of the connection is degraded.

34. A method according to claim 31, wherein the communication quality measuring procedure comprises
- a procedure of measuring an average communication quality of all connections,
- a procedure of comparing the measured average communication quality with the communication quality of each connection, and
- a procedure of, when a connection whose communication quality is lower than the average communication quality by more than a predetermined ratio is present in the plurality of connections, determining that the communication performance of the connection is degraded.

35. A method according to claim 19, further comprising a procedure of stopping use of a connection with a lowest communication quality when the number of connections in use for communication is not less than a predetermined number.

36. A method according to claim 19, further comprising a procedure of changing the number of connections in use in accordance with a duration from a start of communication.

37. A method according to claim 19, wherein in the selection procedure, the connection to output is selected for every packet, every predetermined data amount, or every data amount that forms a cluster for an upper layer.

38. A non-transitory computer readable recording medium storing a data communication program which causes a computer to execute procedures comprising:

- a procedure for network processing units, wherein each network processing unit establishes a logical communication protocol connection and sends or receives a block generated by segmenting transmission data via the connection;
- a procedure of estimating, for each block and each of the connections established by said processing units, an arrival time of the block from an apparatus at one of a final reception terminal and a merging apparatus through a network;
- a procedure of selecting, for each block, a connection with a shortest arrival time from the connections established by the network processing units on the basis of an estimation result; and
- a procedure of outputting each block from each of said network processing units to the network by using the selected connection,
- wherein the procedure of selecting a logical communication protocol connection with the shortest arrival time includes measuring for each block and each of the plurality of connections, a first time after the block is distributed to the connection until the block is output to the network, on the basis of:
  - one of a transmission queue length and a transmission wait time of each connection, and
  - an effective throughput of a communication protocol on each connection, wherein the effective throughput is a throughput output from TCP to a protocol adjacent to TCP.

* * * * *